US011204805B2

(12) United States Patent
Yabe et al.

(10) Patent No.: US 11,204,805 B2
(45) Date of Patent: Dec. 21, 2021

(54) COMPUTATIONAL RESOURCE MANAGEMENT APPARATUS WHICH OPTIMIZES COMPUTATIONAL RESOURCES TO BE ALLOCATED TO TASKS HAVING A DEPENDENCY RELATIONSHIP, COMPUTATIONAL RESOURCE MANAGEMENT METHOD AND COMPUTER READABLE RECORDING MEDIUM

(71) Applicant: NEC CORPORATION, Tokyo (JP)

(72) Inventors: Akihiro Yabe, Tokyo (JP); Masato Asahara, Tokyo (JP); Ryohei Fujimaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 16/608,113

(22) PCT Filed: Apr. 9, 2018

(86) PCT No.: PCT/JP2018/014959
§ 371 (c)(1),
(2) Date: Oct. 24, 2019

(87) PCT Pub. No.: WO2018/198745
PCT Pub. Date: Nov. 1, 2018

(65) Prior Publication Data
US 2021/0103472 A1 Apr. 8, 2021

Related U.S. Application Data

(60) Provisional application No. 62/490,895, filed on Apr. 27, 2017.

(51) Int. Cl.
*G06F 9/48* (2006.01)
*G06F 9/50* (2006.01)

(52) U.S. Cl.
CPC .......... *G06F 9/5011* (2013.01); *G06F 9/4881* (2013.01)

(58) Field of Classification Search
None
See application file for complete search history.

(56) References Cited

U.S. PATENT DOCUMENTS 9,262,216 B2 * 2/2016 Bodik .................. G06F 9/4887
9,367,357 B2 * 6/2016 Cadambi ............... G06F 9/5044
(Continued)

FOREIGN PATENT DOCUMENTS

JP 2004-502235 A 1/2004
JP 2013-164750 A 8/2013
(Continued)

OTHER PUBLICATIONS

International Search Report (PCT/ISA/210) dated Jul. 10, 2018, issued by the International Searching Authority in counterpart International Application No. PCT/JP2018/014959.
(Continued)

*Primary Examiner* — Van H Nguyen
(74) *Attorney, Agent, or Firm* — Sughrue Mion, PLLC

(57) ABSTRACT

A computational resource management apparatus is for managing a cluster system that executes a plurality of tasks. The computational resource management apparatus includes a condition specification unit that specifies a relationship between computational resources of the cluster system and computation time, a dependency relationship between tasks, and an execution time limit of each task, and a scheduling unit that determines, for each task, an execution sequence and computational resources to be allocated from among the computational resources of the cluster system, based on the relationship between the computational resources and com-
(Continued)

putation time and the dependency relationship that are specified, such that the execution time limit is met.

6 Claims, 11 Drawing Sheets

(56) References Cited

U.S. PATENT DOCUMENTS

| | | | | |
|---|---|---|---|---|
| 9,513,967 | B2* | 12/2016 | Dube | G06F 9/5011 |
| 9,715,408 | B2* | 7/2017 | Dube | G06F 9/5027 |
| 9,720,738 | B2* | 8/2017 | Anghel | G06F 9/5027 |
| 10,552,774 | B2* | 2/2020 | Shih | G06Q 10/06315 |
| 2016/0085587 | A1* | 3/2016 | Dube | G06F 9/5005 |
| | | | | 718/104 |

FOREIGN PATENT DOCUMENTS

| | | |
|---|---|---|
| JP | 2013-182502 A | 9/2013 |
| JP | 2015-22574 A | 2/2015 |
| WO | 02/01344 A2 | 1/2002 |

OTHER PUBLICATIONS

Written Opinion (PCT/ISA/237) dated Jul. 10, 2018, issued by the International Searching Authority in counterpart International Application No. PCT/JP2018/014959.

* cited by examiner

COMPUTATIONAL RESOURCES (16 CORES)

| $w_1$ 4core | $w_3$ 4core | $w_2$ 4core | $w_4$ 4core | | |
|---|---|---|---|---|---|
| ※LOW EFFICIENCY DESPITE LARGE NUMBER OF CORES BEING USED | ※LOW EFFICIENCY DESPITE LARGE NUMBER OF CORES BEING USED | ※LOW EFFICIENCY DESPITE LARGE NUMBER OF CORES BEING USED | ※LOW EFFICIENCY DESPITE LARGE NUMBER OF CORES BEING USED | | |

$W_3$ EXECUTION TIME LIMIT    $W_4$ EXECUTION TIME LIMIT

Fig.10

|        | 1 CORE | 2 CORES | 3 CORES | 4 CORES |
|--------|--------|---------|---------|---------|
| TASK 1 | 8      | 6       | 5       | 4       |
| TASK 2 | 4      | 3       | 2       | 2       |
| TASK 3 | 8      | 6       | 5       | 5       |
| TASK 4 | 5      | 4       | 3       | 3       |

COMPUTATIONAL RESOURCE MANAGEMENT APPARATUS WHICH OPTIMIZES COMPUTATIONAL RESOURCES TO BE ALLOCATED TO TASKS HAVING A DEPENDENCY RELATIONSHIP, COMPUTATIONAL RESOURCE MANAGEMENT METHOD AND COMPUTER READABLE RECORDING MEDIUM

This application is a National Stage of PCT International Application Ser. No. PCT/JP2018/014959 filed on Apr. 9, 2018 which designates the United States, incorporated herein by reference, and which is based upon and claims the benefit of priority from U.S. Provisional Application No. 62/490,895 filed on Apr. 27, 2017, the entire contents of which are incorporated herein by reference.

TECHNICAL FIELD

The present invention relates to a computational resource management apparatus and a computational resource management method for optimizing allocation of computational resources to tasks in a clustering system that executes a plurality of tasks, and, furthermore, relates to a computer readable recording medium for realizing the apparatus and method.

BACKGROUND ART

In recent years, analysis systems have been proposed that analyze large amounts of data to provide users with optimal solutions in predetermined conditions, such as the input amount of materials in a plant, the operation amount of operating equipment, or the set price of a product, for example. Such analysis systems can also provide information for the user to make the final selection, such as a judgment index, for example.

Given that that the data amount to be analyzed is markedly increasing yearly, cluster systems are used as the analysis system. A cluster system distributes tasks and executes the distributed tasks in parallel.

Here, for example, the task of optimizing the input amount of materials in a plant, the operation amount of operating equipment, the set price of a product or the like based on past data will be considered. Normally, such optimization processing needs to be executed in units of one day or one week. This is because the data serving as a basis for the optimization processing is updated daily. Also, it is necessary to execute the optimization processing and derive an optimal solution before decision-making by a business operator. For example, if the optimized set price is not decided before the business operator sets the price of a product, the business will be unable to sell the product. Accordingly, it is important for the analysis system to complete a task by a deadline.

In order to complete a task by a deadline, the computational resources with which the analysis system is provided need to be used efficiently. Thus, for example, Patent Document 1 discloses a system that is able to derive a core count for executing tasks efficiently. The system disclosed in Patent Document 1 computes, for each task to be executed in parallel, a core count that minimizes the execution time of the task, within a range of core counts capable of executing parallel processing, and executes the tasks with the computed core count.

LIST OF RELATED ART DOCUMENTS

Patent Document

Patent Document 1: Japanese Patent Laid-Open Publication No. 2015-022574

SUMMARY OF INVENTION

Problems to be Solved by the Invention

Incidentally, for example, the abovementioned task for optimizing the set price of a product is actually constituted by a plurality of tasks that have a dependency relationship, namely, a task for extracting a feature amount from past data, a task for forecasting demand, and a task for optimizing the set price. These tasks may also be executed separately on other types of data. Typically, two feature amount extraction tasks having different input data are performed separately.

In such a case, the two feature amount extraction tasks can be executed in parallel, but the demand forecasting task and the set price optimization task need to be executed thereafter. In other words, normally, with tasks, the dependency relationship is provided as a workflow, thus making it necessary to optimize the computational resources that are allocated to the tasks with consideration for this dependency relationship.

However, with the system disclosed in Patent Document 1, the core count that minimizes the execution time is merely calculated for each task, without consideration for the dependency relationship between tasks. Thus, with the system disclosed in Patent Document 1, it is difficult to allocate the optimal computational resources to a plurality of tasks that have a dependency relationship.

An example object of the invention is to provide a computational resource management apparatus, a computational resource management method and a computer readable recording medium that, in the case of executing a plurality of tasks having a dependency relationship, can optimize computational resources to be allocated to each task, taking the dependency relationship into account.

Means for Solving the Problems

A computational resource management apparatus according to an example aspect of the invention is for managing a cluster system that executes a plurality of tasks, the apparatus including:

a condition specification unit configured to specify a relationship between computational resources of the cluster system and computation time, a dependency relationship between the plurality of tasks, and an execution time limit of each of the plurality of tasks; and a scheduling unit configured to determine, for each of the plurality of tasks, an execution sequence and computational resources to be allocated from among the computational resources of the cluster system, based on the relationship and the dependency relationship that are specified, such that the execution time limit is met.

A computational resource management method according to an example aspect of the invention is for managing a cluster system that executes a plurality of tasks, the method including:

(a) a step of specifying a relationship between computational resources of the cluster system and computation time, a dependency relationship between the plurality of tasks, and an execution time limit of each of the plurality of tasks; and (b) a step of determining, for each of the plurality of tasks, an execution sequence and computational resources to be allocated from among the computational resources of the cluster system, based on the relationship and the dependency relationship that are specified in the (a) step, such that the execution time limit is met.

A computer readable recording medium according to an example aspect of the invention includes a program recorded thereon for managing, by computer, a cluster system that executes a plurality of tasks, the program including instructions that causes the computer to carry out:

(a) a step of specifying a relationship between computational resources of the cluster system and computation time, a dependency relationship between the plurality of tasks, and an execution time limit of each of the plurality of tasks; and (b) a step of determining, for each of the plurality of tasks, an execution sequence and computational resources to be allocated from among the computational resources of the cluster system, based on the relationship and the dependency relationship that are specified in the (a) step, such that the execution time limit is met.

Advantageous Effects of the Invention

As described above, according to the invention, in the case of executing a plurality of tasks that have a dependency relationship, computational resources that are allocated to each task can be optimized, taking the dependency relationship into account.

BRIEF DESCRIPTION OF THE DRAWINGS

FIG. 10 illustrates the relationship between computational resources and computation time that is used in a specific example in the example embodiment of the invention.

EXAMPLE EMBODIMENT

Summary of the Invention

Generally, there is a fixed relationship between the time taken to execute one task and the computational resources that are allocated thereto, and processing does not necessarily end faster just because a large amount of computational resources are allocated to one task. That is, taking the core count as a computational resource, in the case where a large number of cores are allocated to tasks, the computation time of tasks that can be parallelized decreases, due to the computations being parallelized, but the computation time of tasks that cannot be parallelized does not decrease even if the core count is increased. This is due to the occurrence of a phenomenon whereby the need for communication between cores arises due to parallelization, which requires computation time. This means that the computational efficiency per unit core decreases with every increase in the number of cores that are allocated.

On the other hand, in the case where there is a dependency relationship between tasks and the execution end time of one task causes a bottleneck in the system, the execution time limit of a given task will be approaching, and thus it may be desired to end the execution of that one task even if it means sacrificing computational efficiency slightly. In such cases, a large number of cores need to be allocated to the task causing the bottleneck, even if it means sacrificing computational efficiency. When computational efficiency is disregarded, however, a situation could arise in which the end of the overall workflow is delayed, and the overall deadline is missed.

Accordingly, in order to efficiently distribute and execute a plurality of tasks, appropriate computational resources need to be allocated to each task, while trading off computational efficiency and early ending of some tasks. That is, when a plurality of tasks that have a dependency relationship are provided as a workflow, it is necessary to allocate computational resources to the tasks and determine the execution sequence of the tasks, while allowing for the fact that tasks to which fewer cores are allocated have a higher computational efficiency and tasks to which more cores are allocated have an earlier execution end time.

Figure 1:
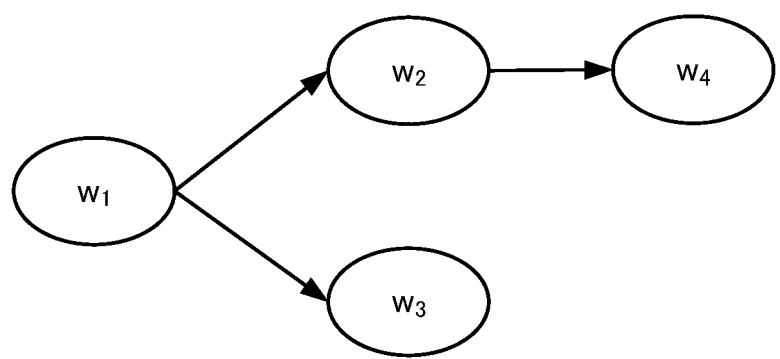
FIG. 1 illustrates an example of a plurality of tasks that have a dependency relationship.

Here, description will be given with a specific example. FIG. 1 illustrates an example of a plurality of tasks that have a dependency relationship. As shown in FIG. 1, the dependency relationship between the plurality of tasks is given in the form of a workflow. The workflow is expressed by a subset $P_w$ of W representing the dependency relationship between the tasks with respect to a set W of tasks ($=\{1, 2, \ldots, n\}$), and each element w of the set W.

In the example in FIG. 1, the set W=$\{1, 2, 3, 4\}$, and the subset P1=$\{\}$, P2=$\{1\}$, P3=$\{1\}$, and P4=$\{2\}$. This represents the fact that the computation of task 2 cannot be started until task 1 ends, and the computation of task 4 cannot be started until the computation of task 2 ends.

For example, in a demand forecasting workflow, task w1 corresponds to a task for extracting feature amounts to be used in forecasting, task w2 corresponds to a task for forecasting demand for the next day, task w3 corresponds to a task for forecasting demand for today, and task w4 corresponds to a task for optimizing price strategy that is based on the demand forecast for the next day.

Assume that a deadline time (execution time limit) dw is given to each task w. Note that, in the case where an execution time limit is not designated, a sufficiently large number ∞ is given as dw. In the example in FIG. 1, assuming that the execution time limits of tasks 3 and 4 are given as 10 [min] and 13 [min], the deadline times will be set such that d1=d2=∞, d3=10, and d4=13.

Assume that each task is given a computation time $f(x\_w)$ for when a computational resource $x\_w$ is provided. Note that, hereinafter, to facilitate description, the computational resource $x\_w$ is assumed to be only the core count of a CPU (Central Processing Unit), but, in the invention, computational resources are not limited to only the core count.

Figure 2:
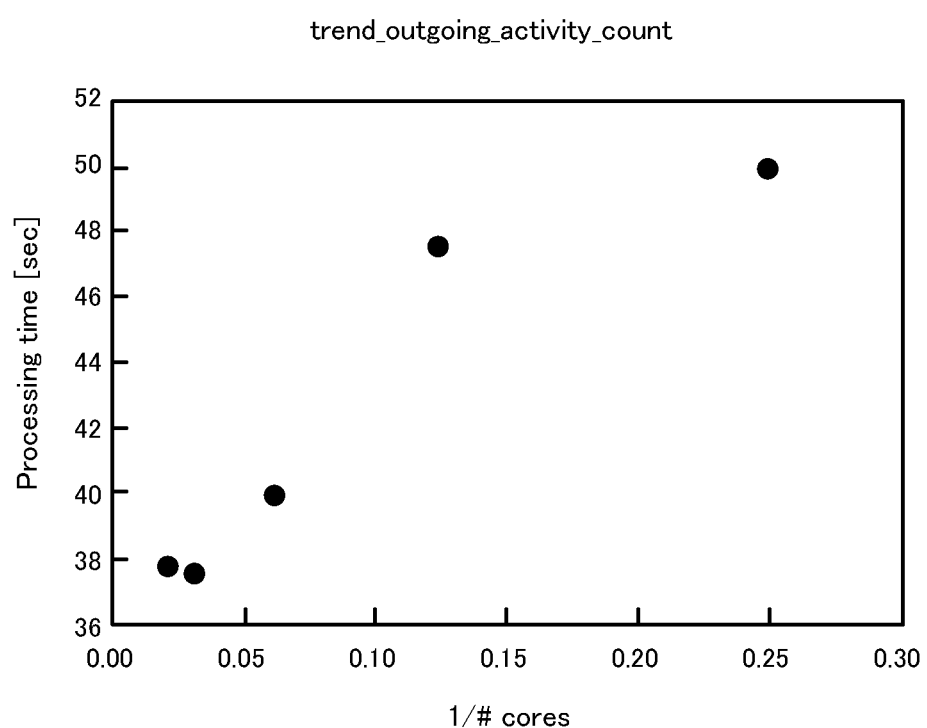
FIG. 2 illustrates an example of the relationship between computational resources and computation time.

The relationship between core count and computation time is as shown in FIG. 2, for example. FIG. 2 illustrates an example of the relationship between computational resources and computation time. In the example in FIG. 2, the computation time of a given task will be f(4)=50 or f(8)=48, due to a difference in core count. This means that the computation time in the case of using four cores for this task will be 50 seconds, and the computation time in the case of using eight cores will be 48 seconds. Also, the computation times shown in FIG. 2 are estimated based on past data. This estimation of the computation time will now be further described.

For example, in the case where the cluster system executes the same computation every week but the contents of the computation differ, the latest computation time can be estimated based on computation times taken in the past. Also, assume the case where estimation processing is performed every week based on different data, using a machine learning engine. Normally, in the case where a machine learning engine is used, computation time is determined depending on the data amount, rather than the specific contents of the data. Therefore, a computation time that depends on the core count can be estimated, by operating the machine learning engine in advance, assuming various combinations of data amount and core count. Note that such estimation requires a situation in which sufficient time is available.

Figure 3:
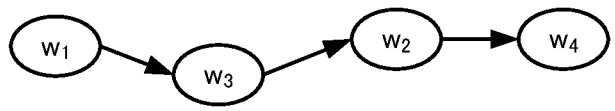
FIG. 3 illustrates a first example of core allocation.
Figure 4:
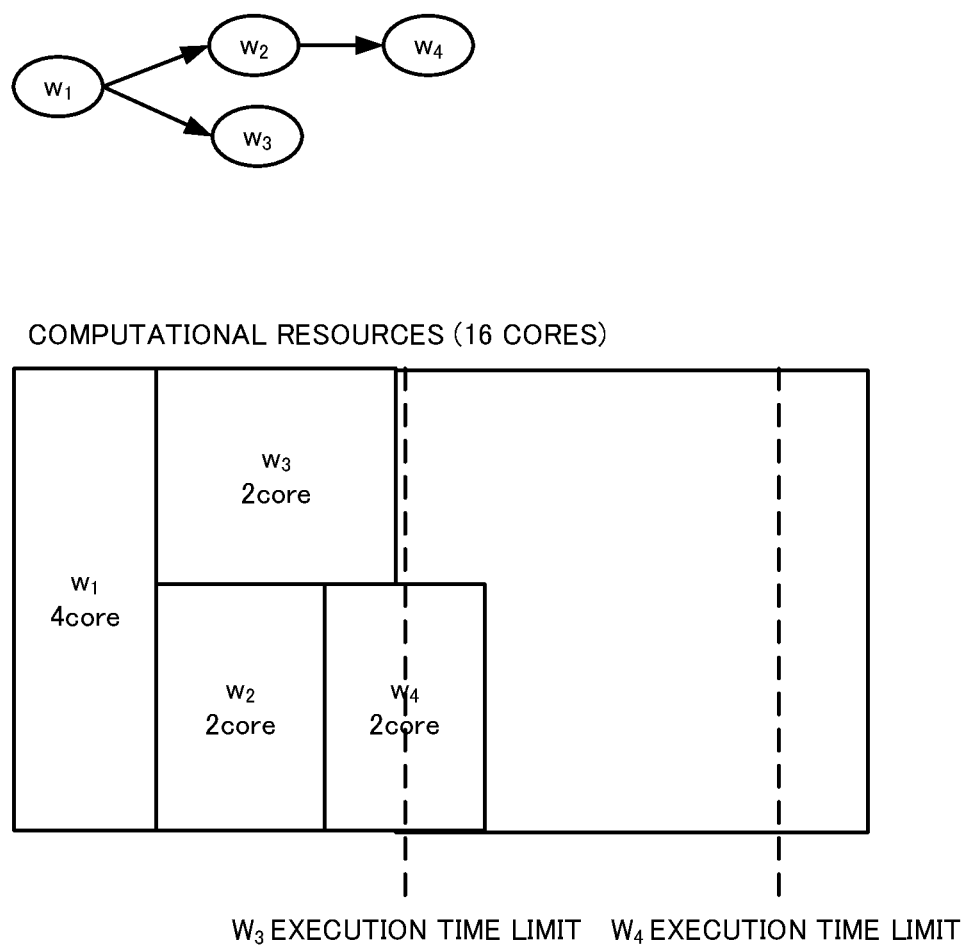
FIG. 4 illustrates a second example of core allocation.
Figure 5:
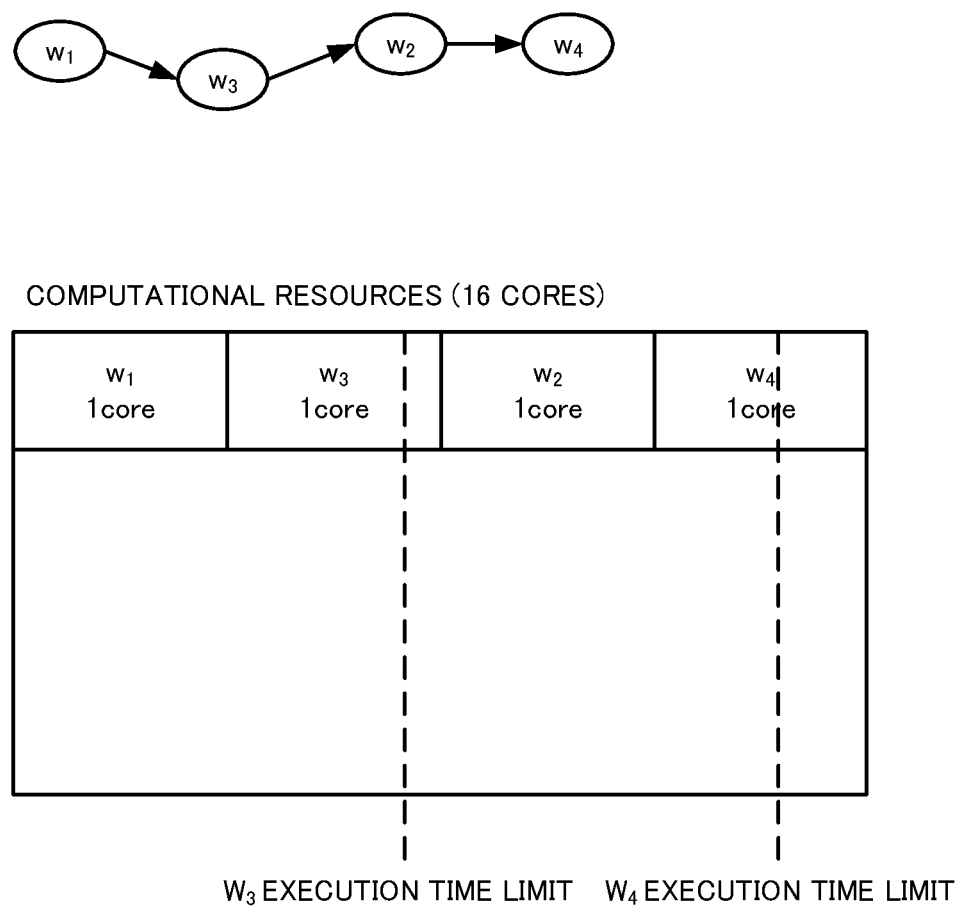
FIG. 5 illustrates a third example of core allocation.
Figure 6:
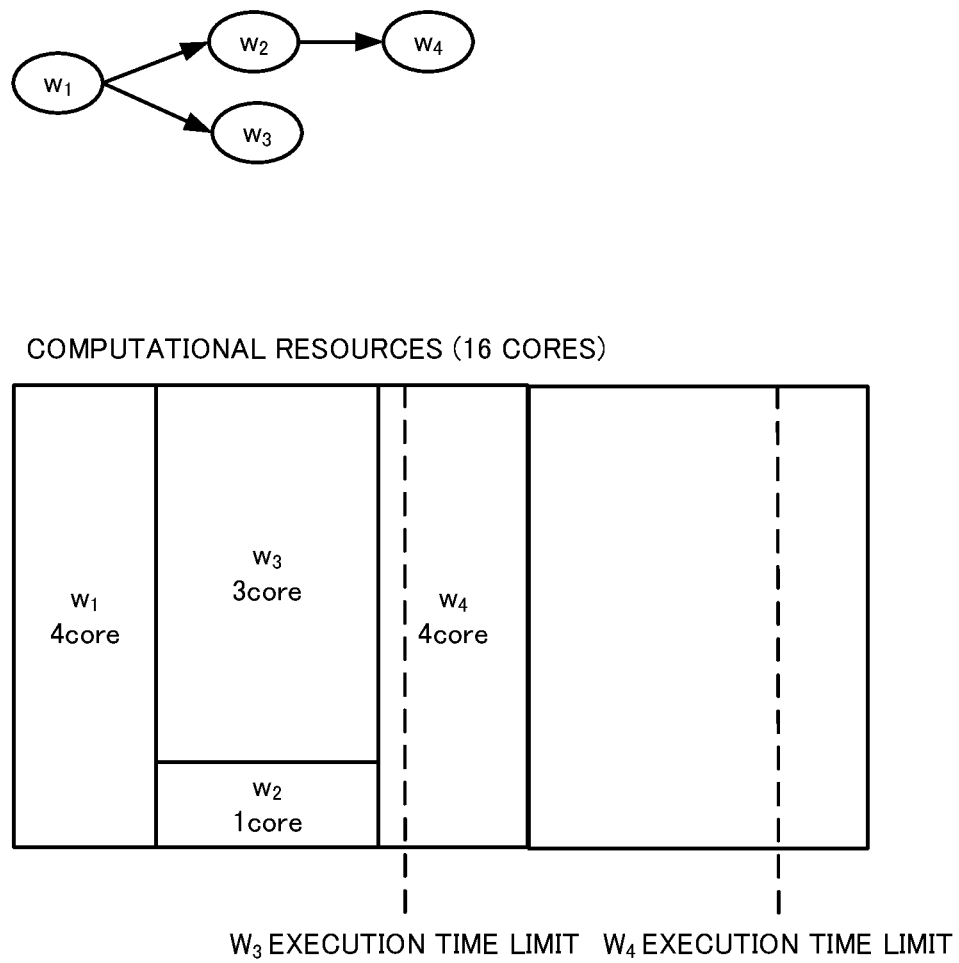
FIG. 6 illustrates a fourth example of core allocation.

Here, the optimal allocation of cores to each task shown in FIG. 1 and the optimal execution start time of each task will be described using FIGS. 3 to 6. Also, in the example in FIGS. 3 to 6, the total available number of cores is four. FIG. 3 illustrates a first example of core allocation. FIG. 4 illustrates a second example of core allocation. FIG. 5 illustrates a third example of core allocation. FIG. 6 illustrates a fourth example of core allocation. Note that, in each diagram, a graph showing the execution sequence of the tasks is displayed in the upper portion.

In the example in FIG. 3, computation is performed with all four cores being used for each task, in order of tasks $w_1$, $w_3$, $w_2$, $w_4$. In contrast, in the example in FIG. 4, task $w_1$ is computed first with four cores, task $w_2$ and $w_3$ are computed next with two cores each, and task $w_4$ is computed with two cores after the end of computation of task $w_2$.

As is clear from FIGS. 3 and 4, generally, the computation time is not necessarily shortened in the order of 1/x, where x is the core count, compared with when the core count is 1. This is because serial processing that cannot be parallelized, data communication and the like need to be performed, in the case of executing tasks with a plurality of cores. Accordingly, the computational efficiency per core is generally better when a task is computed with a low core count. Given this, the best computational efficiency per core is obtained, in the case where one core is taken as the minimum unit, as shown in FIG. 5, and, conversely, the worst computational efficiency per core is obtained in the example in FIG. 3.

On the other hand, it is a waste to leave already secured computational resources unallocated. Furthermore, in the example in FIG. 5, a situation arises in which execution time limits that are set for the tasks are not met. Accordingly, in terms of both computational efficiency and observance of execution time limits, it is ideal to allocate cores to each task as shown in FIG. 4 or 6. The final end time (end time of task 4) of the example in FIG. 4 is the earliest, and although the final end time of the example in FIG. 6 is not the earliest, a sufficient margin can be secured before the final end time, while maintaining high computational efficiency. The invention enables such schedules to be derived.

Example Embodiment

Hereinafter, a computational resource management apparatus, a computational resource management method and a computer readable recording medium in an example embodiment of the invention will be described, with reference to FIGS. 7 to 11.

[Apparatus Configuration]

Figure 7:
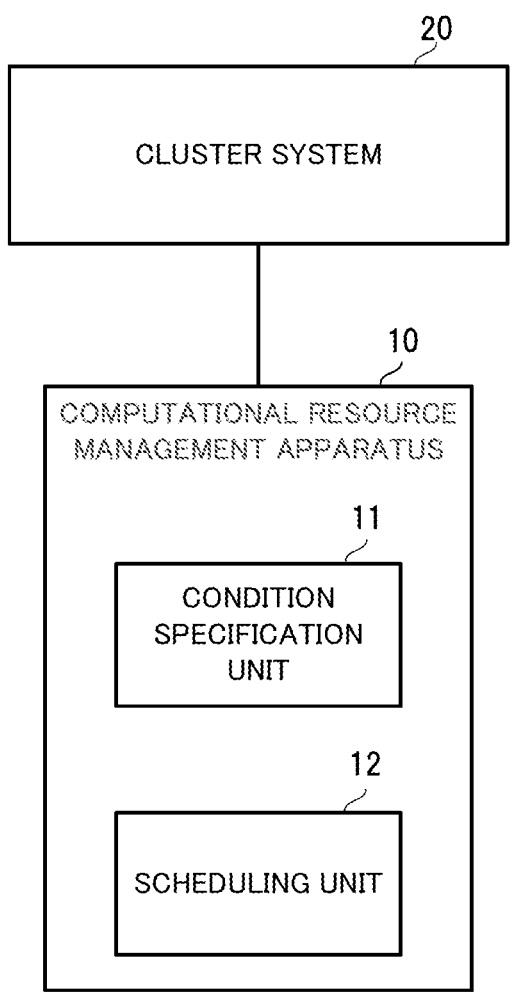
FIG. 7 is a block diagram illustrating a schematic configuration of a computational resource management apparatus in an example embodiment of the invention.

Initially, the configuration of the computational resource management apparatus in the example embodiment will be described using FIG. 7. FIG. 7 is a block diagram illustrating a schematic configuration of the computational resource management apparatus in the example embodiment of the invention.

A computational resource management apparatus 10 in the example embodiment shown in FIG. 7 is for managing a cluster system 20 that executes a plurality of tasks. As shown in FIG. 1, the computational resource management apparatus 10 is provided with a condition specification unit 11 and a scheduling unit 12.

The condition specification unit 11 specifics the relationship between computational resources of the cluster system 20 and computation time, the dependency relationship between the plurality of tasks, and the respective execution time limits of the plurality of tasks. The scheduling unit 12 determines, for each task, the execution sequence and the computational resources to be allocated from among the computational resources of the cluster system 20, based on the relationship between the computational resources and computation time and the dependency relationship between the tasks that are specified, such that the execution time limit is met.

In this way, the computational resource management apparatus 10 performs scheduling of tasks, based on the relationship between the computational resources and computation time, the dependency relationship between the tasks, and the execution time limit of each task. Thus, in the example embodiment, in the case of executing a plurality of tasks that have a dependency relationship, the computational resources that are allocated to each task can be optimized, taking the dependency relationship into account.

Figure 8:
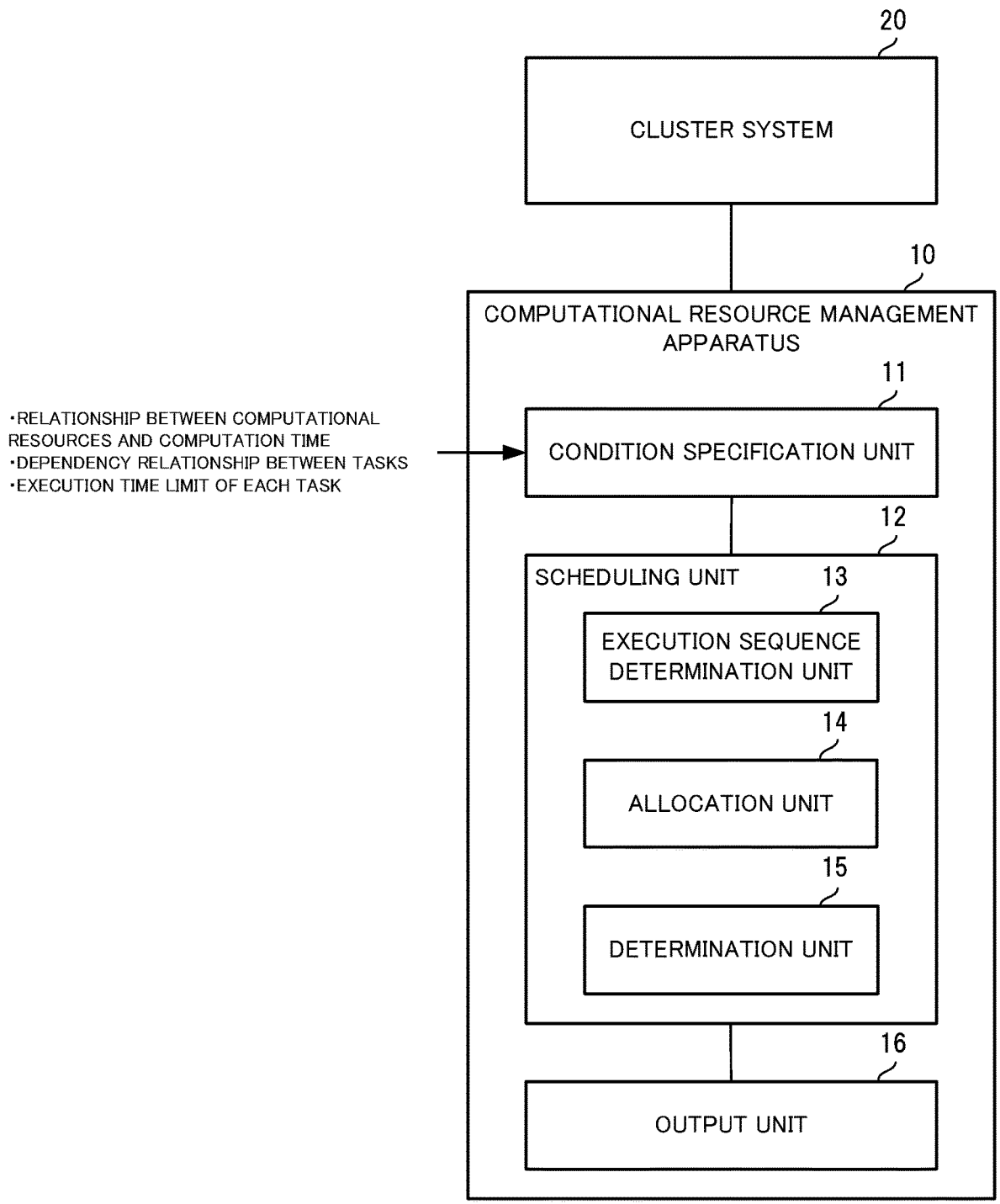
FIG. 8 is a block diagram illustrating a specific configuration of the computational resource management apparatus in the example embodiment of the invention.

Next, the configuration of the computational resource management apparatus 10 will be described more specifically, using FIG. 8. FIG. 8 is a block diagram illustrating a specific configuration of the computational resource management apparatus in the example embodiment of the invention.

As shown in FIG. 8, in the example embodiment, the condition specification unit 11 acquires, from an external source, the relationship between the computational resources of the cluster system 20 and computation time, the dependency relationship between the tasks, and the execution time limit of each task. Specifically, in the case where this information is transmitted from an external terminal device, the condition specification unit 11 acquires the transmitted information. Also, in the case where this information is input using an input device such as a keyboard, the condition specification unit 11 acquires the input information. Also, the condition specification unit 11 passes the acquired information to the scheduling unit 12.

The scheduling unit 12, in the example embodiment, is provided with an execution sequence determination unit 13, an allocation unit 14, and a determination unit 15.

The execution sequence determination unit 13 determines the execution sequence of the tasks, based on the dependency relationship between the tasks and the execution time limit for each task. The allocation unit 14 executes allocation of arbitrary computational resources to each task on the basis of the execution sequence determined by the execution sequence determination unit 13.

In the scheduling unit 12, determination processing by the execution sequence determination unit 13 and allocation processing by the allocation unit 14 are performed as a series of processing a plurality of times. Thereafter, the determination unit 15 determines, for each task, the execution sequence and the computational resources to be allocated, based on a result of the series of processing.

Specifically, in the scheduling unit 12, the execution sequence determination unit 13 first determines an initial execution sequence for the tasks, and then the allocation unit 14 allocates cores to each task. Next, the execution sequence determination unit 13 changes the execution sequence of the tasks. Also, the allocation unit 14 changes the core count, taking the changed execution sequence into account. That is, scheduling is executed a plurality of times in the scheduling unit 12.

The determination unit 15 determines, whenever the series of processing is executed, whether each task will be completed within the execution time limit, and determines the final execution sequence of the tasks and the number of cores to be allocated, based on the determination results. Furthermore, the determination unit 15 is able to select a series of processing in which the execution end time of each task satisfies a set condition, among the series of processing for which it is determined that each task will be completed within the execution time limit.

In the example embodiment, the computational resource management apparatus 10 is also provided with an output unit 16, in addition to the abovementioned condition specification unit 11 and scheduling unit 12. The output unit 16 creates data for visualizing the results of the scheduling, and transmits the created data to an external terminal device. The output unit 16 is also able to visualize the results of the scheduling on the screen of a display device.

Also, in the example embodiment, the relationship between the core count and computation time for each task, for example, is given as the relationship between the computational resources of the cluster system 20 and computation time. A specific example of the relationship between the core count and computation time will be described later using FIG. 10.

[Apparatus Operations]

Figure 9:
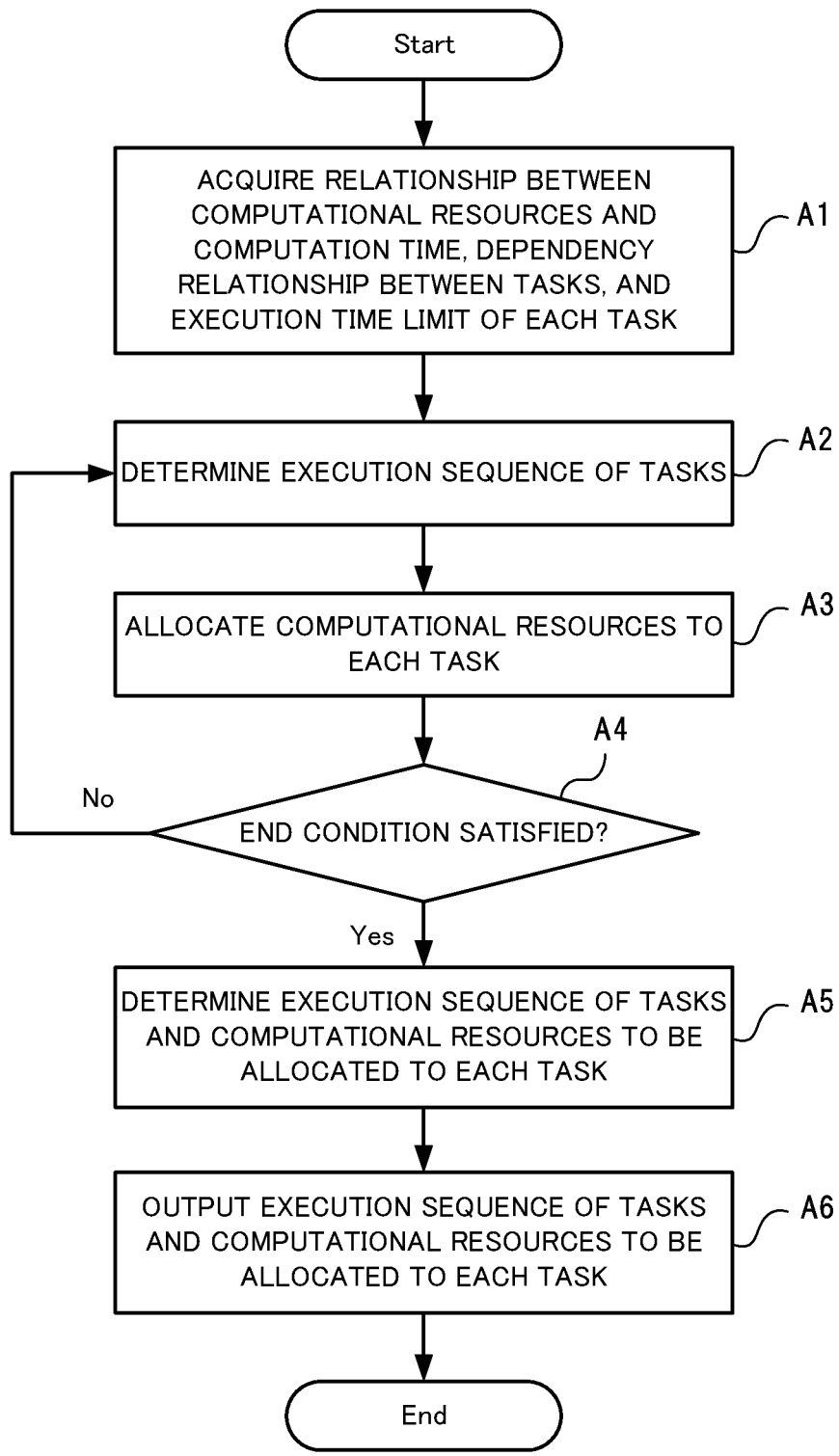
FIG. 9 is a flowchart illustrating operations of the computational resource management apparatus in the example embodiment of the invention.

Next, operations of the computational resource management apparatus 10 in the example embodiment of the invention will be described using FIG. 9. FIG. 9 is a flowchart illustrating operations of the computational resource management apparatus in the example embodiment of the invention. In the following description, FIGS. 7 and 8 will be referred to as appropriate. Also, in the example embodiment, a computational resource management method is implemented by operating the computational resource management apparatus. Therefore, description of the computational resource management method in the example embodiment is replaced by the following description of the operations of the computational resource management apparatus 10.

As shown in FIG. 9, initially, the condition specification unit 11 acquires, from an external source, the relationship between the computational resources of the cluster system 20 and computation time, the dependency relationship between the tasks, and the execution time limit of each task, and specifies the acquired relationships and execution time limits (step A1). Specifically, the condition specification unit 11 specifies the relationship between the computational resources and computation time shown in FIG. 2, the dependency relationship between the tasks shown in FIG. 1, and the execution time limits (d1=d2=∞, d3=10, d4=15) shown in FIG. 1.

Here, the core count is used as a computational resource, the total core count is given as C, and $x_w$ is given as the number of cores to be allocated to task w. Also, the computation time at which task w ends is given as tw. $\sigma(w)$ represents the sequence in which computation of w ends, where σ indicates permutation, and, at this time, the following equation 1 holds based on the definition of σ. Permutation represents the rearrangement of 1, 2, . . . , n. In particular, here, this means that the computation of task w is the i-th to end, in the case where $\sigma(w)=i$.

$$0 = t_0 \leq t_{\sigma^{-1}(1)} \leq t_{\sigma^{-1}(2)} \leq \ldots \leq t_{\sigma^{-1}(n)} \quad \text{[Equation 1]}$$

Note that, in the above equation 1, $t_0$ is the computation start time, for convenience sake. Also, $\pi(w)$ represents task w immediately before starting computation of task w. At this time, the following equation 2 holds by definition. This means that the computation end sequence $\sigma(w)$ of task w is greater than the computation end sequence $\sigma(\pi(w))$ of the immediately previous task $\pi(w)$.

$$\sigma(w) \geq \sigma(\pi(w)) \quad \text{[Equation 2]}$$

The following equation 3 holds with respect to all of task w and elements p of Pw, based on constraints relating to the dependency relationship of the tasks.

$$\sigma(\pi(w)) \geq \sigma(p) \quad \text{[Equation 3]}$$

The above equation 3 exhibits the characteristic that the computation end sequence of the task $\pi(w)$ immediately previous to the computation of task w being executed must be greater than or equal to the computation end sequence of any prior task p.

Next, in the scheduling unit 12, the execution sequence determination unit 13 first determines the execution sequence for each task (step A2).

Specifically, in step A2, the scheduling unit 12, in the case where processing is already being performed, uses σ and π determined in the previous processing as the initial execution sequence. On the other hand, in a state where no processing has yet been performed, the scheduling unit 12 computes σ and π as the initial execution sequence in the following manner.

First, the execution sequence determination unit 13 chooses task $w_1$ having the earliest execution time limit (refer to FIG. 1), and arranges the tasks whose computation must end before the execution start time of $w_1$ as $w_{11}$, $w_{12}, \ldots, w_{1n1}$, $w_1$, such that the dependency relationship is satisfied.

Similarly, the task that the execution sequence determination unit 13 takes, as $w_2$, the task having the earliest execution time limit among tire tasks that have not yet been chosen, and arranges the tasks whose computation must end therebefore as $w_{21}, \ldots, w_{2n2}$, $w_2$, such that the dependency relationship is satisfied.

As a result of the above, the execution sequence determination unit 13 obtains an order of priority of tasks $w_{11}, \ldots, w_{1n1}, w_1, w_{21}, \ldots, w_2, w_{31}, w_3, \ldots$ The execution sequence determination unit 13 then assigns the order of priority in this order, and sets $\sigma(w_{11})=1$, $\alpha(w_{12})=2, \ldots$ Also, the execution sequence determination unit 13 allocates π to the previous task. The initial values of σ and π are thereby obtained.

Next, in the scheduling unit 12, the allocation unit 14 allocates cores to each task, based on the execution sequence determined in step A2 (step A3). Next, the scheduling unit 12 determines whether the condition for ending the repetition processing is satisfied, with step A2 being executed again if not satisfied, and step A5 being executed if satisfied. Note that, as the end condition, steps A2 and A3 being preformed a preset number of times or all the tasks being completed within the execution time limit are given as examples.

Here, step A3 will be specifically described. First, when the execution sequence is determined, constraints represented by the following linear inequalities of equation 4 exist on the core count and the dependency relationship between tasks.

$$W(w, \sigma, \pi) := \{w' \in W \mid \sigma(\pi(w')) < \sigma(w) \le \sigma(w')\} \quad \text{[Equation 4]}$$

$$0 =: t_0 \le t_{\sigma^{-1}(1)} \le t_{\sigma^{-1}(2)} \le \wedge \le t_{\sigma^{-1}(|W|)}$$

$$y_w \ge 1, w \in W,$$

$$t_w - t_{\pi(w)} \ge g_w(y_w), w \in W,$$

$$\sum_{w' \in W(w,\sigma,\pi)} y_{w'} \le C, w \in W,$$

$$\sum_{w' \in W(w,\sigma,\pi)} m_{w'} \cdot y_{w'} \le M, w \in W,$$

$$s_w - s \ge t_w - d_w, w \in D,$$

$$s_w \ge 0, w \in D,$$

$$s \ge 0$$

In the above equation 4, $W(w, \sigma, \pi)$ is a set of a workflow that is computed at the same time, and $s_w$ is a new variable corresponding to each task w. Under these constraints, the final end time shown in following equation 5 and the problem of optimizing a margin s described later are formulated as a linear integer planning problem.

$$\text{Final end time} = t_{\sigma^{-1}(n)} \quad \text{[Equation 5]}$$

The allocation unit 14 then calculates the execution sequence determined in step A2, and, for each task, the number of cores to be allocated and the computation time, under the constraints shown in the above equation 4. At this time, it is assumed that the end time of task w and the end time of task π(w) coincide in the workflow W. That is, it is assumed that the following equation 6 or 7 holds.

$$t_w - t_{\pi(w)} = f_w(x_w) \quad \text{[Equation 6]}$$

$$t_{\sigma^{-1}(i)} = t_{\sigma^{-1}(i+1)},$$

$$t_{\sigma^{-1}(i+1)} - t_{\pi(\sigma^{-1}(i+1))} > f_{\sigma^{-1}(i+1)}(x_{\sigma^{-1}(i+1)}) \quad \text{[Equation 7]}$$

In this case, the ith task to end and the i+1th task to end have equal end times, and although the computation of the i+1th task can in fact end the earliest, the computation of the i+1th task is delayed in order to satisfy the constraints of the sequence.

Accordingly, in such a workflow W, the solution is expected to be improved by interchanging task π(w) with a task having an earlier end time than this task π(w), that is, by setting task π(w) to $\sigma^{-1}(\sigma(\pi(w))-1)$ or interchanging $\sigma^{-1}(i)$ and $\sigma^{-1}(i+1)$. Thus, in the following step A2, the execution sequence determination unit 13 determines the execution sequence of the tasks by interchanging tasks.

In the repeat step A2, the way of choosing the tasks to be interchanged is not particularly limited. For example, the execution sequence determination unit 13 selects the task w whose core efficiency, that is, $f_w(x_w)/f_w(1)$, is the lowest, and changes σ or π of the selected task w with the abovementioned method.

In step A5, the determination unit 15 determines the final execution sequence of the tasks and number of cores to be allocated. Specifically, the determination unit 15 determines whether each task will be completed within the execution time limit, whenever steps A2 and A3 are executed. The determination unit 15 then determines the final execution sequence of the tasks and number of cores to be allocated, based on the obtained determination results.

Thereafter, the output unit 16 externally outputs the results of the scheduling obtained in the processing of steps A1 to A5 (step A6). Thus ends the processing in the computational resource management apparatus 10.

Specific Example

Next, a specific example in the example embodiment will be described. First, in step A1 shown in FIG. 9, it is assumed that the dependency relationship between the tasks shown in FIG. 1 and the execution time limits (d1=d2=∞, d3=10, d4=13) shown in FIG. 1 are provided.

Also, it is assumed that the total number of cores of the cluster system is four, and the table shown in FIG. 10 is provided as the relationship between the computational resources (cores) and computation time for each task. FIG. 10 illustrates the relationship between computational resources and computation time that is used in the specific example in the example embodiment of the invention. In the example in FIG. 10, computation times in the case where the number of cores allocated to each task is 1, 2, 3 and 4 are shown.

Next, in step A2, the execution sequence determination unit 13 determines the initial execution sequence of the tasks, in order of tasks 1, 3, 2, 4, for example. In this case, σ(1)=1, σ(3)=2, σ(2)=3, and σ(4)=4. This gives π(1)=0, π(3)=1, π(2)=3, and π(4)=2. These initial values correspond to the upper part of the graph in FIG. 5.

Also, in this case, given that allocation of the four cores to all the tasks will be optimal when the core count is optimized with respect to the final end time, the allocation unit 14 allocates the cores to the tasks, as shown in the lower part of FIG. 5. The end times of the tasks, when given as t1, t2, t3, and t4, will be $t_1$=4 sec, $t_2$=11 sec, $t_3$=9 sec, and $t_4$=14 sec from a zero start time. Note that, in this case, this results in the execution time limit of task 4 not being met.

Here, since the values of σ and π cannot be changed with regard to tasks 1, 3 and 4 without failing to satisfy the constraints, task 2 is examined. Then, given that only the value of π of task 2 can be changed, the execution sequence determination unit 13 sets π(2)=1, that is, changes the task immediately before task 2 from 3 to 1. Due to this change, the execution sequence of the tasks will be as shown in the upper part of FIG. 6.

When the allocation unit 14 optimizes the number of cores allocated to each task after this change, the result will be as shown in the lower part of FIG. 6. In this case, $t_1$=4 sec, $t_2$=9 sec, $t_3$=9 sec, and $t_4$=12 sec.

In this case, $t_2$=$t_3$ holds for tasks 2 and 3. Note that the actual computation time ($f_2(1)$) of task 2 is 4 seconds (refer to FIG. 10), whereas the computation time of task 2 is 5 seconds in FIG. 6. This is because task 2 needs to end after task 3 due to constraints arising from the execution sequence of the tasks (upper part of FIG. 6). Accordingly, the execution sequence determination unit 13 eliminates these constraints, and interchanges σ(2) and σ(3).

After this interchange, the execution sequence of the tasks will be as shown in the upper part of FIG. 4. Also, when the number of cores that are allocated to each task is optimized, the result will be as shown in the lower part of FIG. 4. In the example in the lower part of FIG. 4, the final end time is the shortest, with $t_1=4$ sec, $t_2=7$ sec, $t_3=10$ sec, and $t_4=11$ sec.

The determination unit 15 selects a series of processing in which the execution end time of each task satisfies a set condition, among the series of processing for which it is determined that each task is completed within the execution time limit. For example, because the example in the lower part of FIG. 6 is the optimal solution in the case of wanting to maximize the margin from the final end time, the determination unit 15 determines the execution sequence and the computational resources as shown in the example in the lower part of FIG. 6.

As described above, in the example embodiment, the computational resource management apparatus 10 changes the objective variables of optimization, and selects the best result from among the iterative processing. Thus, in the case of executing a plurality of tasks that have a dependency relationship, computational resources that are allocated to each task can be optimized, taking the dependency relationship into account.

[Program]

A computer program of the example embodiment need only be a program that causes a computer to execute steps A1 to A6 shown in FIG. 9. The computational resource management apparatus 10 and the computational resource management method in the example embodiment can be realized, by installing this program on a computer and executing the installed program. In this case, a CPU (Central Processing Unit) of the computer functions and performs processing as the condition specification unit 11, the scheduling unit 12, and the output unit 16.

Also, the program in the example embodiment may be executed by a computer system constructed by a plurality of computers. In this case, for example, each computer may function as one of the condition specification unit 11, the scheduling unit 12, and the output unit 16.

Figure 11:
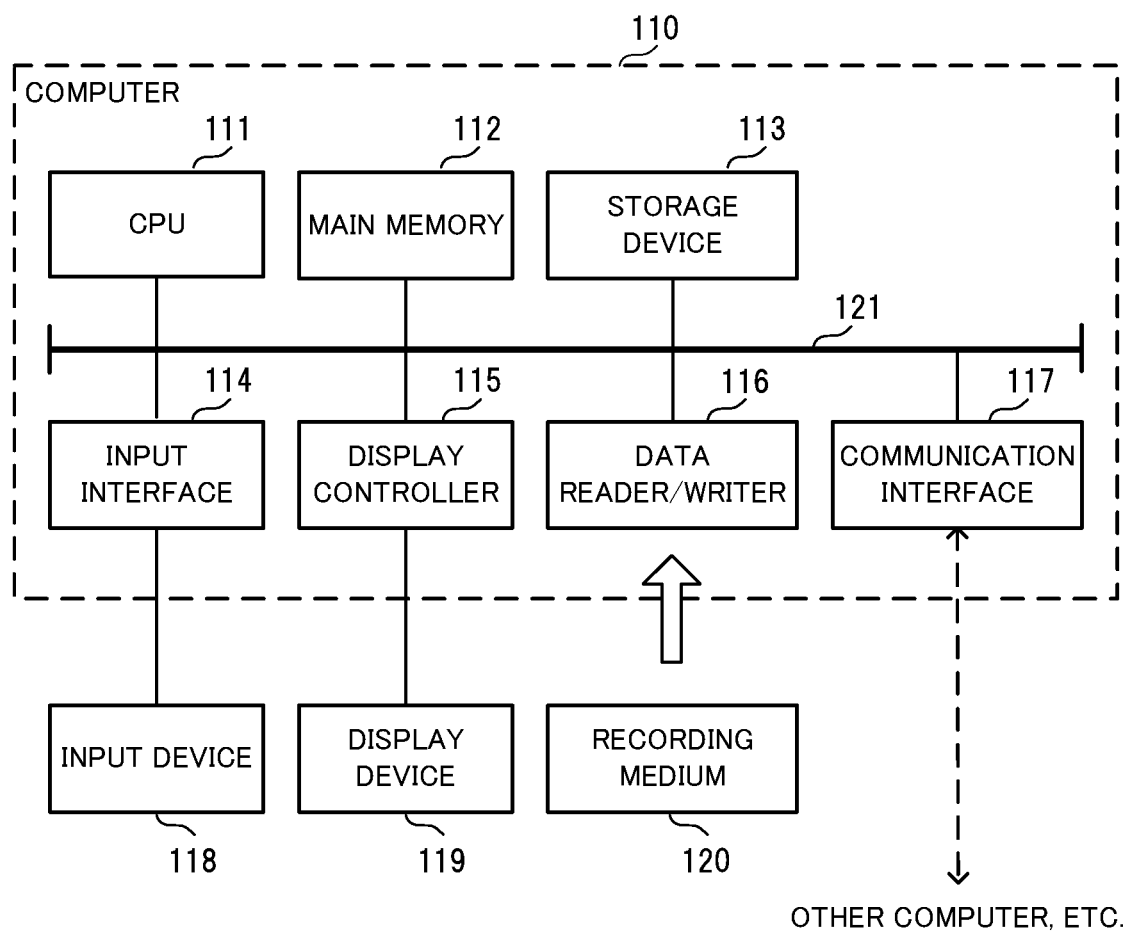
FIG. 11 is a block diagram illustrating an example of a computer that realizes the computational resource management apparatus in the example embodiment of the invention.

Here, a computer that realizes the computational resource management apparatus 10 by executing computer programs of the example embodiment will be described using FIG. 11. FIG. 11 is a block diagram illustrating an example of a computer that realizes the computational resource management apparatus 10 in the example embodiment of the invention.

As shown in FIG. 11, a computer 110 is provided with a CPU 111, a main memory 112, a storage device 113, an input interface 114, a display controller 115, a data reader/writer 116, and a communication interface 117. These units are connected to each other in a manner that enables data communication, via a bus 121.

The CPU 111 implements various computational operations, by extracting programs (codes) of the example embodiment that are stored in the storage device 113 to the main memory 112, and executing these programs in a predetermined order. The main memory 112 is, typically, a volatile storage device such as a DRAM (Dynamic Random Access Memory). Also, the programs in the example embodiment are provided in a state of being stored in a computer readable recording medium 120. Note that the programs of the example embodiment may be distributed on the Internet connected via the communication interface 117.

As the storage device 113, a semiconductor memory device such as a flash memory is given as a specific example, in addition to a hard disk drive. The input interface 114 mediates data transmission between the CPU 111 and an input device 118 such as a keyboard and a mouse. The display controller 115 is connected to a display device 119, and controls display that is performed on the display device 119.

The data reader/writer 116 mediates data transmission between the CPU 111 and the recording medium 120, and executes readout of computer programs from the recording medium 120 and writing of processing results of the computer 110 to the recording medium 120. The communication interface 117 mediates data transmission between the CPU 111 and other computers.

As the recording medium 120, a general-purpose semiconductor storage device such as a CF (Compact Flash®) card or an SD (Secure Digital) card, a magnetic recording medium such as a flexible disk, and an optical recording medium such as a CD-ROM (Compact Disk Read Only Memory) are given as specific examples.

Note that the computational resource management apparatus 10 of the example embodiment is also realizable by using hardware corresponding to each unit, rather than by a computer on which computer programs are installed. Furthermore, part of the computational resource management apparatus 10 may be realized by programs, and the remaining part may be realized by hardware.

The abovementioned example embodiment can be partially or wholly realized by supplementary notes 1 to 12 described below, but the invention is not limited to the following description.

(Supplementary Note 1)

A computational resource management apparatus for managing a cluster system that executes a plurality of tasks, including:

a condition specification unit configured to specify a relationship between computational resources of the cluster system and computation time, a dependency relationship between the plurality of tasks, and an execution time limit of each of the plurality of tasks; and a scheduling unit configured to determine, for each of the plurality of tasks, an execution sequence and computational resources to be allocated from among the computational resources of the cluster system, based on the relationship and the dependency relationship that are specified, such that the execution time limit is met.

(Supplementary Note 2)

The computational resource management apparatus according to supplementary note 1, in which the scheduling unit:

performs, as a series of processing a plurality of times, processing for determining the execution sequence of each of the plurality of tasks, based on the dependency relationship and the execution time limit, and processing for allocating arbitrary computational resources to each of the plurality of tasks on a basis of the determined execution sequence, and determines, for each of the plurality of tasks, the execution sequence and the computational resources to be allocated from among the computational resources of the cluster system.

(Supplementary Note 3)

The computational resource management apparatus according to supplementary note 2, in which the scheduling unit:

selects a series of processing in which an execution end time of each of the plurality of tasks satisfies a set condition, among the series of processing for which each of the plurality of tasks is completed within the execution time limit, and determines, for each of the plurality of tasks, the execution sequence and the computational resources to be allocated from among the computational resources of the cluster system, using a result of the determination processing and the allocation processing in the selected series of processing.

(Supplementary Note 4)

The computational resource management apparatus according to any of supplementary notes 1 to 3, in which the relationship is a relationship between core count and computation time for each of the plurality of tasks.

(Supplementary Note 5)

A computational resource management method for managing a cluster system that executes a plurality of tasks, including:

(a) a step of specifying a relationship between computational resources of the cluster system and computation time, a dependency relationship between the plurality of tasks, and an execution time limit of each of the plurality of tasks; and (b) a step of determining, for each of the plurality of tasks, an execution sequence and computational resources to be allocated from among the computational resources of the cluster system, based on the relationship and the dependency relationship that are specified in the (a) step, such that the execution time limit is met.

(Supplementary Note 6)

The computational resource management method according to supplementary note 5, in which, in the (b) step:

processing for determining the execution sequence of each of the plurality of tasks, based on the dependency relationship and the execution time limit, and processing for allocating arbitrary computational resources to each of title plurality of tasks on a basis of the determined execution sequence are performed as a series of processing a plurality of times, and the execution sequence and the computational resources to be allocated from among the computational resources of the cluster system are determined, for each of the plurality of tasks.

(Supplementary Note 7)

The computational resource management method according to supplementary note 6, in which, in the (b) step:

a series of processing in which an execution end time of each of the plurality of tasks satisfies a set condition is selected, among the series of processing for which each of the plurality of tasks is completed within the execution time limit, and the execution sequence and the computational resources to be allocated from among the computational resources of the cluster system are determined, for each of the plurality of tasks, using a result of the determination processing and the allocation processing in the selected series of processing.

(Supplementary Note 8)

The computational resource management method according to any of supplementary notes 5 to 7, in which the relationship is a relationship between core count and computation time for each of the plurality of tasks.

(Supplementary Note 9)

A computer readable recording medium that includes a program recorded thereon for managing, by computer, a cluster system that executes a plurality of tasks, the program including instructions that causes the computer to carry out:

(a) a step of specifying a relationship between computational resources of the cluster system and computation time, a dependency relationship between the plurality of tasks, and an execution time limit of each of the plurality of tasks; and (b) a step of determining, for each of the plurality of tasks, an execution sequence and computational resources to be allocated from among the computational resources of the cluster system, based on the relationship and the dependency relationship that are specified in the (a) step, such that the execution time limit is met (Supplementary Note 10)

The computer readable recording medium according to supplementary note 9, in which, in the (b) step:

processing for determining the execution sequence of each of the plurality of tasks, based on the dependency relationship and the execution time limit, and processing for allocating arbitrary computational resources to each of the plurality of tasks on a basis of the determined execution sequence are performed as a series of processing a plurality of times, and the execution sequence and the computational resources to be allocated from among the computational resources of the cluster system are determined, for each of the plurality of tasks.

(Supplementary Note 11)

The computer readable recording medium according to supplementary note 10, in which, in the (b) step:

a series of processing in which an execution end time of each of the plurality of tasks satisfies a set condition is selected, among the series of processing for which each of the plurality of tasks is completed within the execution time limit, and the execution sequence and the computational resources to be allocated from among the computational resources of the cluster system are determined, for each of the plurality of tasks, using a result of the determination processing and the allocation processing in the selected series of processing.

(Supplementary Note 12)

The computer readable recording medium according to any of supplementary notes 9 to 11, in which the relationship is a relationship between core count and computation time for each of the plurality of tasks.

Although the instant invention has been described above with reference to embodiments, the invention is not intended to be limited to the above embodiments. A person skilled in the art will appreciate that the configurations and details of the instant invention can be variously modified within the scope of the invention.

This application claims priority, based on U.S. Application No. 62/490,895 filed on Apr. 27, 2017, and the entire contents thereof are hereby incorporated herein.

INDUSTRIAL APPLICABILITY

As described above, according to the invention, in the case of executing a plurality of tasks that have a dependency relationship, computational resources that are allocated to each task can be optimized, taking the dependency relationship into account. The invention is useful in cluster systems, for example.

LIST OF REFERENCE SIGNS

10 Computational resource management apparatus
11 Condition specification unit

12 Scheduling unit
13 Execution sequence determination unit
14 Allocation unit
15 Determination unit
16 Output unit
20 Cluster system
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. A computational resource management apparatus for managing a cluster system that executes a plurality of tasks, comprising:
a memory; and
a processor configured to operate according to instructions stored in the memory to implement:
a condition specification unit configured to specify a relationship between computational resources of the cluster system and computation time, a dependency relationship between the plurality of tasks, and an execution time limit of each of the plurality of tasks; and
a scheduling unit configured to determine, for each of the plurality of tasks, an execution sequence and computational resources to be allocated from among the computational resources of the cluster system, based on the relationship and the dependency relationship that are specified, such that the execution time limit is met,
wherein the processor is further configured to operate according to the instructions to control the scheduling unit to:
perform, as a series of processing a plurality of times, processing for determining the execution sequence of each of the plurality of tasks, based on the dependency relationship and the execution time limit, and processing for allocating arbitrary computational resources to each of the plurality of tasks on a basis of the determined execution sequence,
select a series of processing in which an execution end time of each of the plurality of tasks satisfies a set condition, among the series of processing for which each of the plurality of tasks is completed within the execution time limit, and
determine, for each of the plurality of tasks, the execution sequence and the computational resources to be allocated from among the computational resources of the cluster system, using a result of the determination processing and the allocation processing in the selected series of processing.

2. The computational resource management apparatus according to claim 1, wherein the relationship is a relationship between core count and computation time for each of the plurality of tasks.

3. A computational resource management method for managing a cluster system that executes a plurality of tasks, comprising:
(a) specifying a relationship between computational resources of the cluster system and computation time, a dependency relationship between the plurality of tasks, and an execution time limit of each of the plurality of tasks; and
(b) determining, for each of the plurality of tasks, an execution sequence and computational resources to be allocated from among the computational resources of the cluster system, based on the relationship and the dependency relationship that are specified in the (a), such that the execution time limit is met,
wherein, in the (b):
processing for determining the execution sequence of each of the plurality of tasks, based on the dependency relationship and the execution time limit, and processing for allocating arbitrary computational resources to each of the plurality of tasks on a basis of the determined execution sequence are performed as a series of processing a plurality of times,
a series of processing in which an execution end time of each of the plurality of tasks satisfies a set condition is selected, among the series of processing for which each of the plurality of tasks is completed within the execution time limit, and
the execution sequence and the computational resources to be allocated from among the computational resources of the cluster system are determined, for each of the plurality of tasks, using a result of the determination processing and the allocation processing in the selected series of processing.

4. The computational resource management method according to claim 3, wherein the relationship is a relationship between core count and computation time for each of the plurality of tasks.

5. A non-transitory computer readable recording medium that includes a program recorded thereon for managing, by computer, a cluster system that executes a plurality of tasks, the program including instructions that causes the computer to carry out:
(a) a step of specifying a relationship between computational resources of the cluster system and computation time, a dependency relationship between the plurality of tasks, and an execution time limit of each of the plurality of tasks; and
(b) a step of determining, for each of the plurality of tasks, an execution sequence and computational resources to be allocated from among the computational resources of the cluster system, based on the relationship and the dependency relationship that are specified in the (a) step, such that the execution time limit is met,
wherein, in the (b) step:
processing for determining the execution sequence of each of the plurality of tasks, based on the dependency relationship and the execution time limit, and processing for allocating arbitrary computational resources to each of the plurality of tasks on a basis of the determined execution sequence are performed as a series of processing a plurality of times,
a series of processing in which an execution end time of each of the plurality of tasks satisfies a set condition is selected, among the series of processing for which each of the plurality of tasks is completed within the execution time limit, and
the execution sequence and the computational resources to be allocated from among the computational resources of the cluster system are determined, for each of the plurality of tasks, using a result of the determination processing and the allocation processing in the selected series of processing.

6. The non-transitory computer readable recording medium according to claim 5, wherein the relationship is a relationship between core count and computation time for each of the plurality of tasks.

\* \* \* \* \*